US007444496B2

(12) United States Patent
Shiomi et al.

(10) Patent No.: US 7,444,496 B2
(45) Date of Patent: Oct. 28, 2008

(54) APPARATUS, SYSTEM, AND METHOD FOR DETERMINING THE CONSISTENCY OF A DATABASE

(75) Inventors: Tatsuyuki Shiomi, Kawasaki (JP); Shigeko Mori, Yamato (JP); Takashi Yonezawa, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/535,786

(22) Filed: Sep. 27, 2006

(65) Prior Publication Data
US 2007/0106703 A1    May 10, 2007

(30) Foreign Application Priority Data
Oct. 4, 2005    (JP)    ............................. 2005-291155

(51) Int. Cl.
*G06F 17/30*    (2006.01)
(52) U.S. Cl. ....................................................... 712/22
(58) Field of Classification Search .................. 712/22; 707/201, 200, 203
See application file for complete search history.

(56) References Cited

U.S. PATENT DOCUMENTS

| 5,359,720 | A | * | 10/1994 | Tamura et al. | ............... | 711/108 |
|---|---|---|---|---|---|---|
| 5,418,947 | A | * | 5/1995 | Hsu et al. | ....................... | 707/1 |
| 5,694,569 | A | * | 12/1997 | Fischer | ......................... | 711/216 |
| 5,724,538 | A | * | 3/1998 | Morris et al. | ................ | 711/206 |
| 5,933,820 | A |  | 8/1999 | Beier et al. | ..................... | 707/1 |
| 7,107,258 | B2 | * | 9/2006 | Cheng et al. | .................... | 707/3 |
| 7,107,430 | B2 | * | 9/2006 | Grossman et al. | ............ | 711/202 |
| 7,193,874 | B1 | * | 3/2007 | Pereira et al. | .................. | 365/49 |
| 2005/0188207 | A1 | * | 8/2005 | Fujimoto et al. | ............. | 713/177 |

OTHER PUBLICATIONS

International Technical Support Organization, "The Complete IMS HALDB Guide: All You Need to Know to Manage HALDBs," Jun. 2003.

* cited by examiner

*Primary Examiner*—Eric Coleman
(74) *Attorney, Agent, or Firm*—Kunzler & McKenzie

(57) ABSTRACT

An apparatus, system, and method are disclosed for determining the consistency of a database including indirect reference to data elements. There is provided an apparatus for determining consistency of a database. This database includes, in association with each data element, an indirect list element including a storage address of the associated or corresponding data element so that other data elements can reference that data element. This apparatus reads, from each data element, identification information of an indirect list element corresponding to that data element and generates a hash value. This apparatus further reads, from each data element, identification information of an indirect list element corresponding to a data element referenced by that data element and generates a hash value. On condition that these hash values are equivalent to each other, the apparatus determines that the database is consistent.

9 Claims, 10 Drawing Sheets

APPARATUS, SYSTEM, AND METHOD FOR DETERMINING THE CONSISTENCY OF A DATABASE

CROSS-REFERENCES TO RELATED APPLICATIONS

This application claims the right of priority under the Paris Convention to Japan Patent Application Number 2005-291155 entitled "APPARATUS AND METHOD FOR DETERMINING CONSISTENCY OF DATABASE" and filed on Oct. 4, 2005 for Tatsuyuki Shiomi, et al., which is incorporated herein by reference.

BACKGROUND OF THE INVENTION

1. Field of the Invention

This invention relates to determining the consistency of a database and more particularly relates to determining the consistency of a database in which a data element is referenced indirectly.

2. Description of the Related Art

A hierarchical database system (for example, IBM IMS DL/I or IMS) manages data elements by means of a tree structure. In this database, a minimum unit of data is referred to as a data element and a data element located at the highest level of a tree structure is referred to as a root element. A root element has one or more dependent elements which, in turn, have further dependent elements. Specifically, each data element has one or more pointers designating storage addresses of dependent elements. A storage address of each data element may be designated by a relative byte address (RBA), which is an address value relative to a specific address of a partition recording a database.

Such a tree structure is usually formed in a single partition. However, when a large database is constructed, its tree structure may be formed in plural partitions by establishing an association or logical relationship between the partitions. One example of a database realizing this association is HALDB (IMS High Availability Large Database). The HALDB realizes the association by means of indirect list elements. See, for example, U.S. Pat. No. 5,933,820 and "The Complete IMS HALDB Guide: All You Need to Know to Manage HALDBS", URL http://www.redbooks.ibm.com/redbooks/pdfs/sg246945.pdf.

A database can improve access efficiency by means of a reorganization operation such as compaction or defragmentation. Since this reorganization operation rerecords a plurality of dispersed data elements in continuous areas, storage addresses of data elements may be changed. A reorganization operation can be performed for each partition regardless of the logical relationship between the partitions. Therefore, in a database stored in a plurality of partitions, if dependency between data elements is designated by storage addresses, a tree structure before a reorganization operation cannot be appropriately maintained after the reorganization operation.

For this reason, according to HALDB, an indirect list element is recorded in a database in association with each data element, which includes a storage address of that data element so that other data elements can reference that data element. A referencing data element (hereinafter referred to as a source data element) has not only a storage address of a data element to be referenced (hereinafter referred to as a target data element) but also identification information of an indirect list element corresponding to the target data element so that the source data element can reference the target data element.

As a reorganization operation is performed in a partition to which a target data element belongs, a storage address in an indirect list element is updated to an appropriate storage address after the reorganization operation. By referencing the indirect list element, a storage address of a target data element included in a source data element can be updated to an appropriate value after the reorganization operation.

In a database reorganization operation, change of database definition, deletion of a data element, and/or change of partitioning may be performed in addition to change of a recording position of a data element. Thus, when a configuration of a database is changed, it is desirable to confirm whether dependency between data elements is appropriately maintained. This confirmation is realized by determining consistency of the database.

Two check types, i.e., a hash check and a full check are used to determine the consistency. In case of a hash check, a database management system (DBMS) reads, from each data element, an RBA of a data element to be referenced to generate a hash value. The DBMS also reads an RBA of each data element to generate a hash value. Then, the DBMS determines that the database is consistent on condition that the generated hash values are equivalent to each other.

If the hash values are not equivalent to each other, a full check is performed. The DBMS reads, from each data element, an RBA of a data element to be referenced, reads an RBA of each data element, and determines whether these are equivalent to each other. In this way, it is possible to appropriately determine not only whether the database is consistent but also inconsistent positions, if any. However, for a database adopting indirect list elements, no method has been proposed to effectively determine consistency of that database. From the foregoing discussion, it should be apparent that a need exists for an apparatus, system, and method to determine the consistency of a database. Beneficially, such an apparatus, system, and method would determine the consistency of a database that includes indirect list elements.

SUMMARY OF THE INVENTION

The present invention has been developed in response to the present state of the art, and in particular, in response to the problems and needs in the art that have not yet been fully solved by currently available databases. Accordingly, the present invention has been developed to provide an apparatus, system, and method for determining the consistency of a database that overcome many or all of the above-discussed shortcomings in the art.

The apparatus to determine the consistency of a database in which an indirect list element is recorded for each data element, the indirect list element including a storage address of that data element in order to cause another data element to reference that data element, is provided with a plurality of modules configured to functionally execute the necessary steps of determining the consistency of a database. These modules in the described embodiments include a first reading unit configured to read identification information from each data element, the identification information identifying an indirect list element corresponding to that data element. The apparatus may also include a second reading unit configured to read identification information from each data element, the identification information identifying an indirect list element corresponding to a referenced data element. Further, the apparatus may include a first generating unit configured to generate a hash value of the identification information read from each data element by the first reading unit. The apparatus may also include a second generating unit configured to generate a hash value of the identification information read from each data element by the second reading unit. Additionally, the apparatus may include a determining unit configured to determine that the database is consistent in response to the hash value generated by the first generating unit being equivalent to the hash value generated by the second generating unit.

The apparatus, in one embodiment, is configured to include with each indirect list element a storage address of a data element corresponding to that indirect list element. The apparatus may further include a third reading unit configured to read a storage address of a data element from each indirect list element, the data element corresponding to the indirect list element. Additionally, the apparatus may include a third generating unit configured to generate a hash value based on the storage address read from each indirect list element by the third reading unit. The apparatus may also include a fourth generating unit configured to generate a hash value based on the storage address of each data element from which the first reading unit has read the identification information of the indirect list element, the determining unit determining that the database is consistent on further condition that the hash value generated by the third generating unit is equivalent to the hash value generated by the fourth generating unit.

The apparatus is further configured, in one embodiment, to include with each indirect list element a storage address of a data element corresponding to that indirect list element in association with identification information of that indirect list element. The apparatus may also include a third reading unit configured to read a storage address of a data element and identification information from each indirect list element, the storage address corresponding to the indirect list element. Additionally, the apparatus may include a third generating unit configured to generate a hash value based on the storage address and identification information read from each indirect list element by the third reading unit. The apparatus may also include a fourth generating unit configured to generate a hash value based on the identification information read from each data element by the first reading unit and the storage address of each data element from which the first reading unit has read the identification information, the determining unit determining that the database is consistent on further condition that the hash value generated by the third generating unit is equivalent to the hash value generated by the fourth generating unit.

In a further embodiment, the apparatus may be configured such that each data element further includes the number of referencing elements that is the number of other data elements referencing that data element, the first reading unit further reads the number of referencing elements from each data element in association with the identification information, and the first generating unit generates a hash value based on a value made by weighting the identification information read from each data element by the first reading unit with the number of referencing elements corresponding to that identification information.

In another embodiment, the apparatus is includes a first adjusting unit responsive to addition of a reference from a data element to another data element and determining that the database is consistent to add to the hash value generated by the first generating unit, a value made by multiplying identification information of an indirect list element corresponding to the referenced data element by an increment from the number of referencing elements included in the referenced data element before addition to the number of referencing elements included in the referenced data element after addition. The apparatus may also include a second adjusting unit configured to add to the hash value generated by the second generating unit identification information of an indirect list element for the referenced data element, which is added to the referencing data element.

The apparatus, in another embodiment, includes a third adjusting unit responsive to addition of a data element to the database and determining that the database is consistent to add to the hash value generated by the third generating unit a hash value based on identification information newly assigned to an indirect list element added in association with the data element and a storage address of the data element. The apparatus may also include a fourth adjusting unit configured to add a hash value to the hash value generated by the fourth generating unit based on identification information of an indirect list element corresponding to the added data element, which is included in the added data element, and a storage address of the added data element.

In a further embodiment, the apparatus is configured such that control information is recorded in the database in association with each of a plurality of indirect list elements, the control information indicating whether that indirect list element is invalid. The apparatus may also be configured such that the third reading unit reads a storage address of a data element and identification information from each of the plurality of indirect list elements from which an indirect list element corresponding to the control information indicating invalidity is excluded, the data element corresponding to that indirect list element.

In another embodiment, the apparatus may include a reorganization unit configured to reorganize the database by changing a storage address of a data element and a reorganization controlling unit configured to record the number of reorganization operations performed on the reorganized database and record the number of the reorganization operations performed on data elements corresponding to indirect list elements as the control information in with the associated indirect list element. The third reading unit may be configured to determine that an indirect list element is invalid in response to the number of reorganization operations recorded in association with the indirect list element is smaller than the number of reorganization operations associated with the database.

The apparatus, in another embodiment, includes a third adjusting unit responsive to deletion of a data element from the database and invalidation of an indirect list element corresponding to the deleted data element and determining that the database is consistent to subtract from the hash value generated by the third generating unit a hash value based on a storage address of the data element included in the invalidated indirect list element and identification information of the invalidated indirect list element. The apparatus may further include a fourth adjusting unit configured to subtract from the hash value generated by the fourth generating unit a hash value based on identification information included in the deleted data element and the storage address of the data element, the determining unit determining that the consistency is maintained on condition that the hash value changed by the third adjusting unit is equivalent to the hash value changed by the fourth adjusting unit.

In another embodiment, the apparatus includes a first adjusting unit responsive to deletion of a data element from the database and invalidation of an indirect list element corresponding to the deleted data element and determining that the database is consistent to subtract from the hash value generated by the first generating unit identification information of the invalidated indirect list element and a second adjusting unit responsive to change of a reference from a data element to another data element to subtract from the hash value generated by the second generating unit identification information included in the data element before change and add to the subtracted hash value identification information recorded in the data element after change. The determining unit may determine that the consistency is maintained on condition that the hash value changed by the first adjusting unit is equivalent to the hash value changed by the second adjusting unit.

A method of the present invention is also presented for determining, by an information processing apparatus, consistency of a database in which an indirect list element is recorded for each data element, the indirect list element including a storage address of that data element in order to make another data elements reference that data element. The method in the disclosed embodiments substantially includes the steps necessary to carry out the functions presented above with respect to the operation of the described apparatus and system. In one embodiment, the method includes reading from each data element identification information of an indirect list element corresponding to that data element, reading from each data element identification information of an indirect list element corresponding to a referenced data element, generating a first hash value of the identification information read from each data element corresponding to that data element, generating a second hash value of the identification information read from each data element corresponding to the referenced data element, and determining that the database is consistent in response to the first hash value being equivalent to the second hash value.

A computer program product of the present invention is also presented comprising a computer readable medium having computer usable program code programmed for determining consistency of a database in which an indirect list element is recorded for each data element, the indirect list element including a storage address of that data element in order to make another data element reference that data element. The computer program product in the disclosed embodiments substantially causes a computer to perform the steps necessary to carry out the functions presented above with respect to the operation of the described apparatus and method. In one embodiment, the operations of the computer program product include a first reading unit configured to read identification information of an indirect list element from each data element, the indirect list element corresponding to that data element; a second reading unit configured to read identification information of an indirect list element from each data element, the indirect list element corresponding to a referenced data element; a first generating unit configured to generate a hash value of the identification information read from each data element by the first reading unit; a second generating unit configured to generate a hash value of the identification information read from each data element by the second reading unit; and a determining unit configured to determine that the database is consistent in response to the hash value generated by the first generating unit being equivalent to the hash value generated by the second generating unit.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
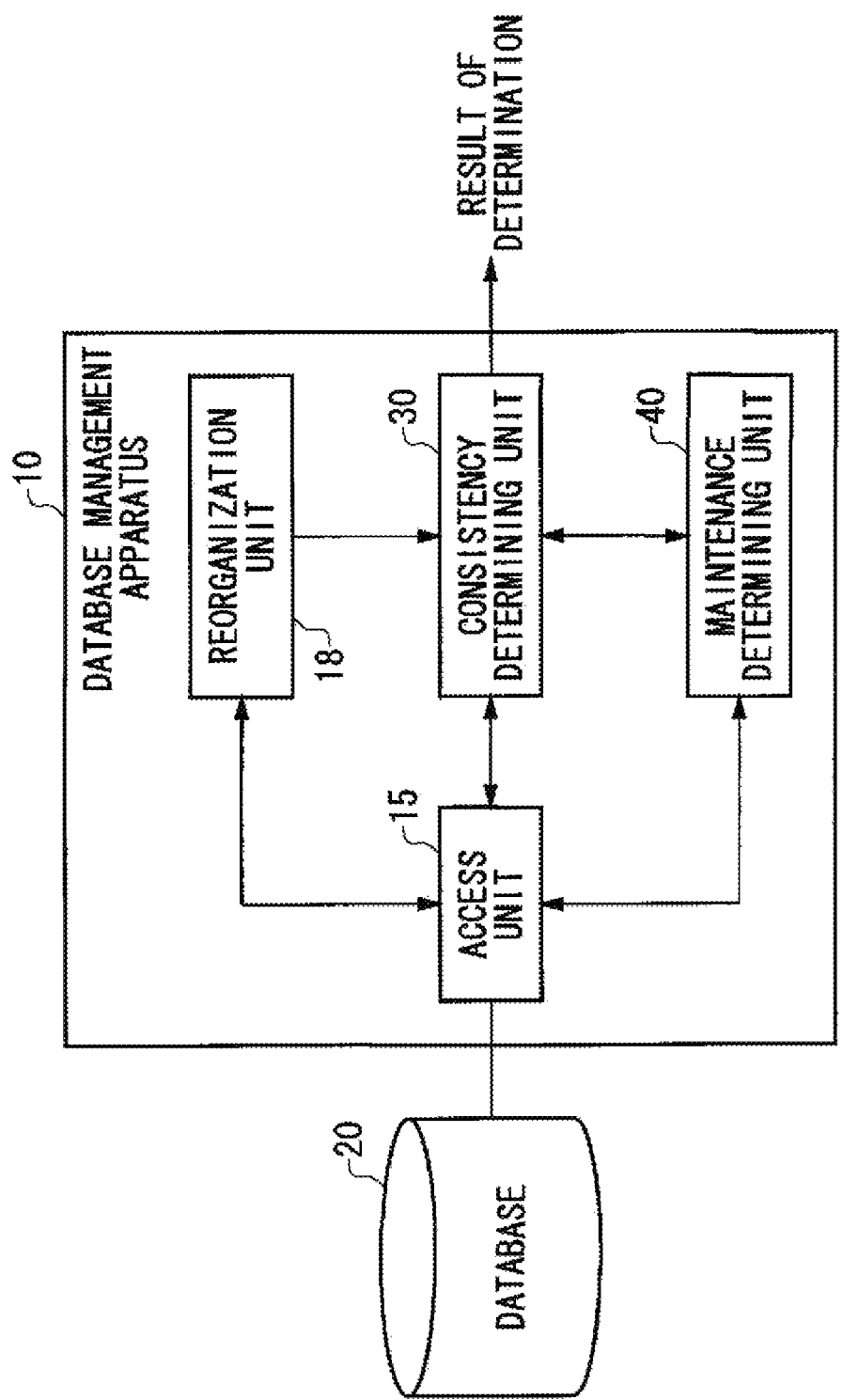
FIG. 1 is a schematic block diagram illustrating a database management apparatus.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 is a schematic block diagram illustrating one embodiment of a database management apparatus 10. The database management apparatus 10 accesses a database 20 and determines consistency of the database 20. Specifically, the database management apparatus 10 may include an access unit 15, a reorganization unit 18, a consistency determining unit 30, and a maintenance determining unit 40. The access unit 15 accesses the database 20 in response to a request from a user or according to a preset schedule. The reorganization unit 18 reorganizes the database 20 by changing storage addresses of data elements in the database 20. This reorganization causes a plurality of data elements to be arranged in continuous areas in the database 20. Thus, efficiency of access to the database 20 can be improved.

The consistency determining unit 30, in one embodiment, determines consistency of the database 20 and outputs a result of the determination when the database 20 is reorganized. The maintenance determining unit 40 determines whether the consistency of the database 20 is maintained when the database 20 is updated in a state where the consistency determining unit 30 has determined that the database 20 is consistent. The database management apparatus 10 according to the present embodiment can appropriately determine the consistency of the database 20 even if the database 20 consists of a plurality of partitions and each of the partitions may be separately reorganized.

Figure 2:
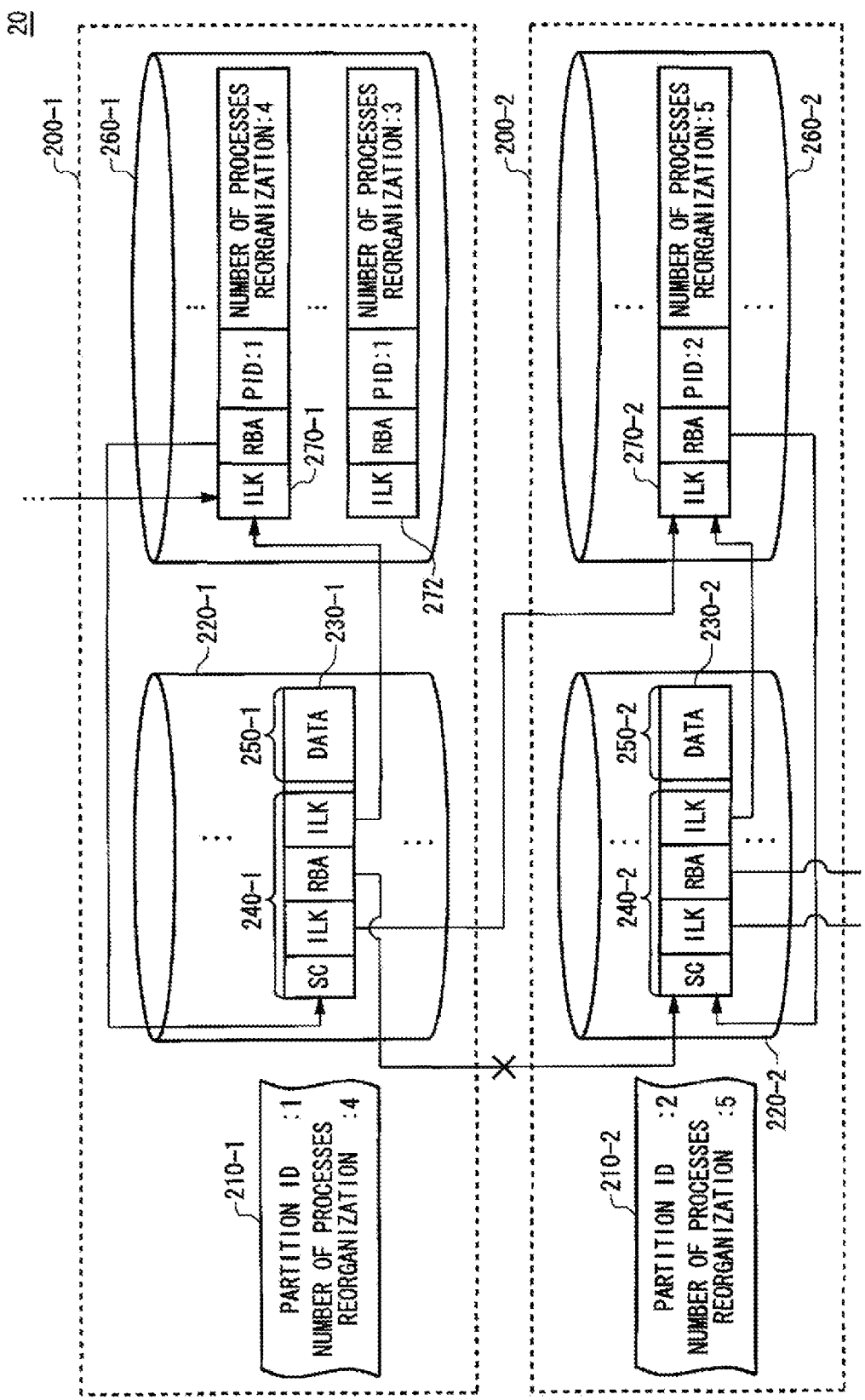
FIG. 2 is a schematic block diagram illustrating one embodiment of a data structure of a database.

FIG. 2 illustrates one embodiment of a data structure of a database 20. The database 20 may have a plurality of partitions, e.g., a partition 200-1 and a partition 200-2. The partition 200-1 includes attribute information 210-1, a data recording section 220-1, and a reference recording section 260-1. The attribute information 210-1 includes identification information (ID) of the partition. The attribute information 210-1 further includes the number of reorganization operations performed in the partition 200-1 which indicates how many times the partition 200-1 has been reorganized. For example, the ID of the partition 200-1 is one, and the number of reorganization operations performed in the partition 200-1 is four. Also, the partition 200-2 includes attribute information 210-2, a data recording section 220-2, and a reference recording section 260-2. The attribute information 210-2 includes identification information (ID) of the partition. The attribute information 210-2 further includes the number of reorganization operations performed in the partition 200-2 which indicates how many times the partition 200-2 has been reorganized. For example, the ID of the partition 200-2 is two, and the number of reorganization operations performed in the partition 200-2 is five.

The data recording section 220-1, in one embodiment, records a plurality of data elements one of which is shown as a data element 230-1. The reference recording section 260-1 records an indirect list element 270-1 including a storage address of the data element 230-1 in association with the data element 230-1 so that the data element 230-1 can be referenced by another data element.

In one embodiment, the data element 230-1 includes a prefix 240-1 and a data portion 250-1. The prefix 240-1 includes the number of referencing elements that is the number of other data elements referencing the data element 230-1. If the number of referencing elements is greater than one, one data element 230-1 is referenced by a plurality of other data elements. The number of referencing elements may be represented by any information identifying the number of referencing elements other than an actual numeric value thereof. In FIG. 2, information identifying the number of referencing elements is shown with an abbreviation "SC". This SC indicates a type of a data element. The number of referencing elements may be determined by the SC or may be different for each data element even if SC is the same. In the latter case, there is a field for holding the number of referencing elements for each data element in addition to the SC.

The prefix 240-1, in one embodiment, includes identification information of an indirect list element corresponding to a data element referenced by the data element 230-1. This identification information is referred to, for example, as ILK (Indirect List Key). In the example of FIG. 2, referenced by the data element 230-1 is a data element 230-2. The reference recording section 260-2 records an indirect list element 270-2 in association with the data element 230-2. Therefore, the prefix 240-1 includes identification information of the indirect list element 270-2 corresponding to a data element referenced by the data element 230-1.

The prefix 240-1 further may include a storage address of a data element referenced by the data element 230-1. This storage address is referred to as RBA (Relative Byte Address) indicating a relative position from a specific base address in the partition 200-2. For this reason, once a storage address of the data element 230-2 is changed by the reorganization of the partition 200-2, the storage address of the data element 230-2 recorded in the prefix 240-1 becomes incorrect. The prefix 240-1 further may include identification information (ILK: Indirect List Key) of the indirect list element 270-1 corresponding to the data element 230-1.

A storage address (RBA) of the data element 230-1 corresponding to the indirect list element 270-1 may be recorded in the indirect list element 270-1 in association with identification information (ILK) of the indirect list element 270-1. When the data element 230-1 is referenced by another data element, the access unit 15 specifies the indirect list element 270-1 by this identification information (ILK) and reads a storage address (RBA) in the indirect list element 270-1 to specify the data element 230-1. The indirect list element 270-1 includes identification information (ID) of the partition 200-1 in which the data element 230-1 corresponding to the indirect list element 270-1 is recorded and the number of reorganization operations by which the data element 230-1 has been reorganized. The number of reorganization operations is incremented by one whenever the data element 230-1 is reorganized by the reorganization unit 18.

Even if the data element 230-1 becomes invalid due to a deletion/update operation on the database 20, the data element 230-1 and the indirect list element 270-1 corresponding thereto may remain in the database 20 without being deleted. In this case, since the data element 230-1 is not involved in the reorganization, the number of reorganization operations included in the indirect list element 270-1 is not increased even if the reorganization is performed. That is, while the number of reorganization operations recorded in the attribute information 210-1 is four, the number of reorganization operations included in the indirect list element 270-1 has a value less than four.

The number of reorganization operations, in one embodiment, serves as control information indicating whether the indirect list element 270-1 is invalid. That is, a third reading unit 350 described below determines that an indirect list element is invalid on condition that the number of reorganization operations recorded in association with the indirect list element is smaller than the number of reorganization operations associated with the database 20. In the example of FIG. 2, "four" is recorded in the indirect list element 270-1 as the number of reorganization operations as well as in the attribute information 210-1, resulting in the equivalent number. Therefore, the third reading unit 350 may determine that the indirect list element 270-1 is valid. On the other hand, "three" is recorded in an indirect list element 272 as the number of reorganization operations, which is different from the number of reorganization operations recorded in the attribute information 210-1. For this reason, the third reading unit 350 determines that the indirect list element 272 is invalid.

The data recording section 220-2, in one embodiment, records a plurality of data elements one of which is the data element 230-2. The reference recording section 260-2 records the indirect list element 270-2 in association with the data element 230-2, in which a storage address of the data element 230-2 is recorded so that the data element 230-2 can be referenced by another data element. The data element 230-2 includes a prefix 240-2 and a data portion 250-2. The prefix 240-2 includes the number of elements referencing the data element 230-2. The prefix 240-2 further includes identification information (ILK) of an indirect list element corresponding to a data element referenced by the data element 230-2, and a storage address of a data element referenced by the data element 230-2.

The prefix 240-2, in one embodiment, further includes identification information (ILK) of the indirect list element 270-2 corresponding to the data element 230-2. The indirect list element 270-2 may include a storage address (RBA) of the data element 230-2 corresponding to the indirect list element 270-2 in association with the identification information (ILK) of the indirect list element 270-2. A reference by the data element 230-1 to the data element 230-2 causes the access unit 15 to first specify the indirect list element 270-2 by means of this identification information (ILK). Then, the access unit 15 specifies the data element 230-2 by reading the storage address (RBA) in the indirect list element 270-2. In this way, it is possible to appropriately reference the data element 230-2 even if the storage address (RBA) of the data element 230-2 included in the data element 230-1 is incorrect.

Figure 3:
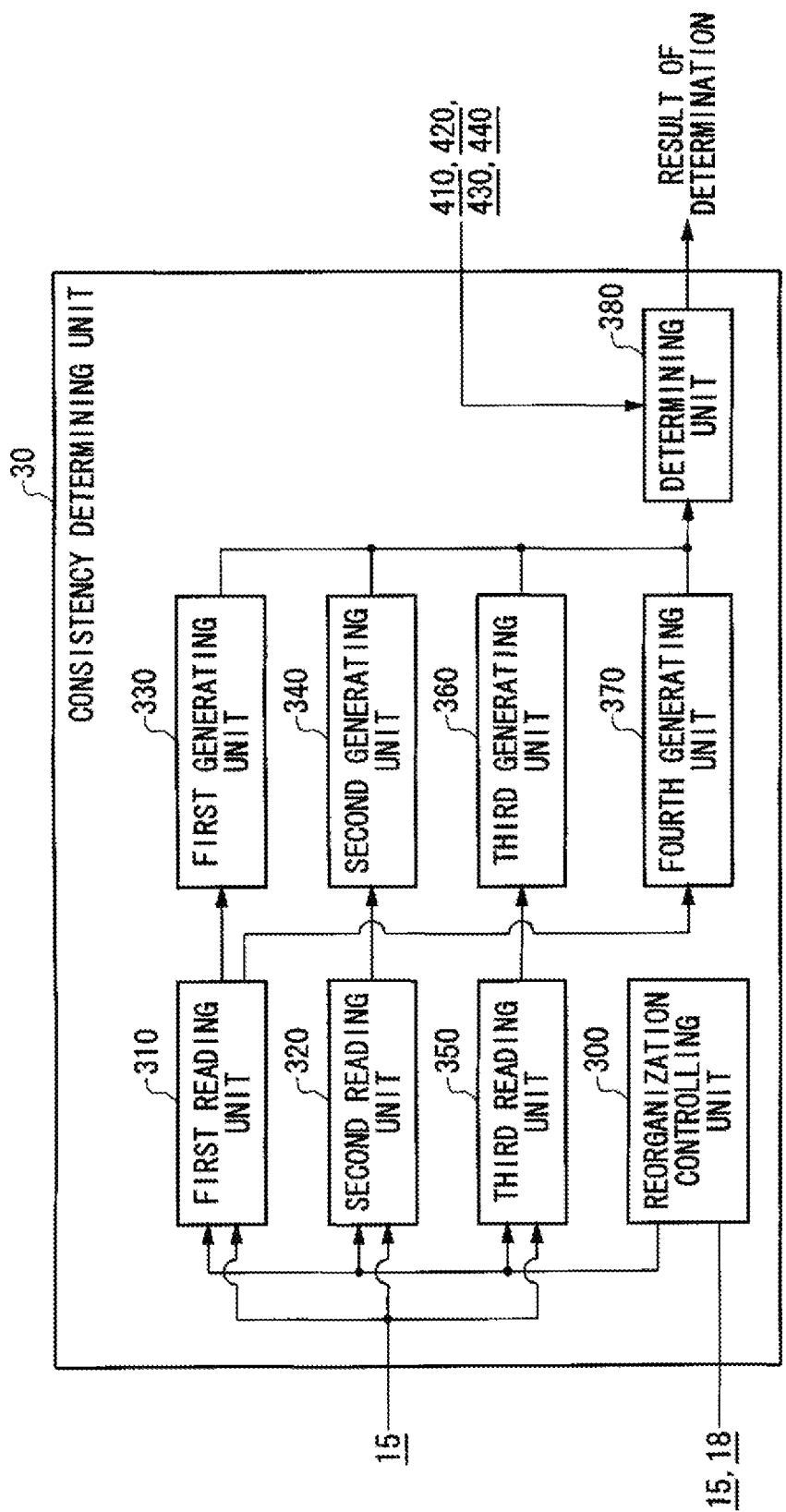
FIG. 3 is a schematic block diagram illustrating one embodiment of a functional configuration of a consistency determining unit in the database management apparatus of FIG. 1.

FIG. 3 shows one embodiment of a functional configuration of the consistency determining unit 30. The consistency determining unit 30 may include a reorganization controlling unit 300, a first reading unit 310, a second reading unit 320, a first generating unit 330, a second generating unit 340, a third reading unit 350, a third generating unit 360, a fourth generating unit 370, and a determining unit 380. The reorganization controlling unit 300 records the number of reorganization operations performed in association with the reorganized database 20. Specifically, the reorganization controlling unit 300, in one embodiment, increments by one the number of reorganization operations recorded in the attribute information 210-1 on condition that the partition 200-1 in the database 20 has been reorganized.

The reorganization controlling unit 300, in one embodiment, records the number of reorganization operations as control information in association with an indirect list element corresponding to a data element involved in the reorganization. Specifically, the reorganization controlling unit 300 may record the updated number of reorganization operations in the indirect list element 270-1 on condition that the partition 200-1 has been reorganized. The reference recording section 260-1 may retain an indirect list element without deleting it, which has been invalidated due to deletion of a corresponding data element. In this case, the reorganization controlling unit 300 does not update the number of reorganization operations for the indirect list element invalidated. Therefore, even if the partition 200-1 has been reorganized, the original number of reorganization operations remains. In this way, it is possible to appropriately distinguish between valid and invalid indirect list elements.

The first reading unit 310, in one embodiment, reads, from each data element, identification information of an indirect list element corresponding to that data element when the database 20 is reorganized. For example, the first reading unit 310 may read an ILK of the indirect list element 270-2 corresponding to the data element 230-2 from the data element 230-2. The first reading unit 310 may further read the number of referencing elements from each data element in association with the identification information of its indirect list element.

In one embodiment, the second reading unit 320 reads, from each data element, identification information of an indirect list element corresponding to a data element referenced by that data element when the database 20 is reorganized. For example, the second reading unit 320 may read an ILK of the indirect list element 270-2 corresponding to the data element 230-2 referenced by the data element 230-1 from the data element 230-1.

The first generating unit 330, in one embodiment, generates a hash value of the identification information read from each data element by the first reading unit 310. Specifically, the first generating unit 330 may compute a hash value based on a value made by weighting the identification information read from each data element by the first reading unit 310 with the number of referencing elements corresponding to the identification information. As an example of the computing process, the first generating unit 330 first multiplies the number of referencing elements of the identification information by each of the read identification information. For example, if identification information is 0x0200 and the number of referencing elements is four, the first generating unit 330 computes 0x0800 made by multiplying 0x0200 by four. Then, the first generating unit 330 obtains a hash value by summing the computed values for the respective data elements. A hash value computed in this manner becomes a first hash value.

In one embodiment, the second generating unit 340 computes a hash value of the identification information read from each data element by the second reading unit 320. The second generating unit 340 may generate a hash value by summing the identification information under a predetermined modulo. This hash value becomes a second hash value. The third reading unit 350 may read, from each of the indirect list elements, a storage address of a data element corresponding to that indirect list element and identification information (ILK) of that indirect list element, to the exclusion of any indirect list element corresponding to the control information indicating invalidity.

The third generating unit 360, in one embodiment, generates a hash value based on a set of the storage address and identification information (ILK) read from each indirect list element by the third reading unit 350. This hash value becomes a third hash value. The fourth generating unit 370 may generate a hash value based on a set of the identification information read from each data element by the first reading unit 310 and the storage address of each data element from which the first reading unit 310 reads the identification information. This hash value becomes a fourth hash value.

The determining unit 380, in one embodiment, determines whether the first hash value generated from the first generating unit 330 is equivalent to the second hash value generated from the second generating unit 340. The determining unit 380 may further determine whether the third hash value generated from the third generating unit 360 is equivalent to the fourth hash value generated from the fourth generating unit 370. The determining unit 380 may determine that the database 20 is consistent on condition that both determinations are affirmative.

Figure 4:
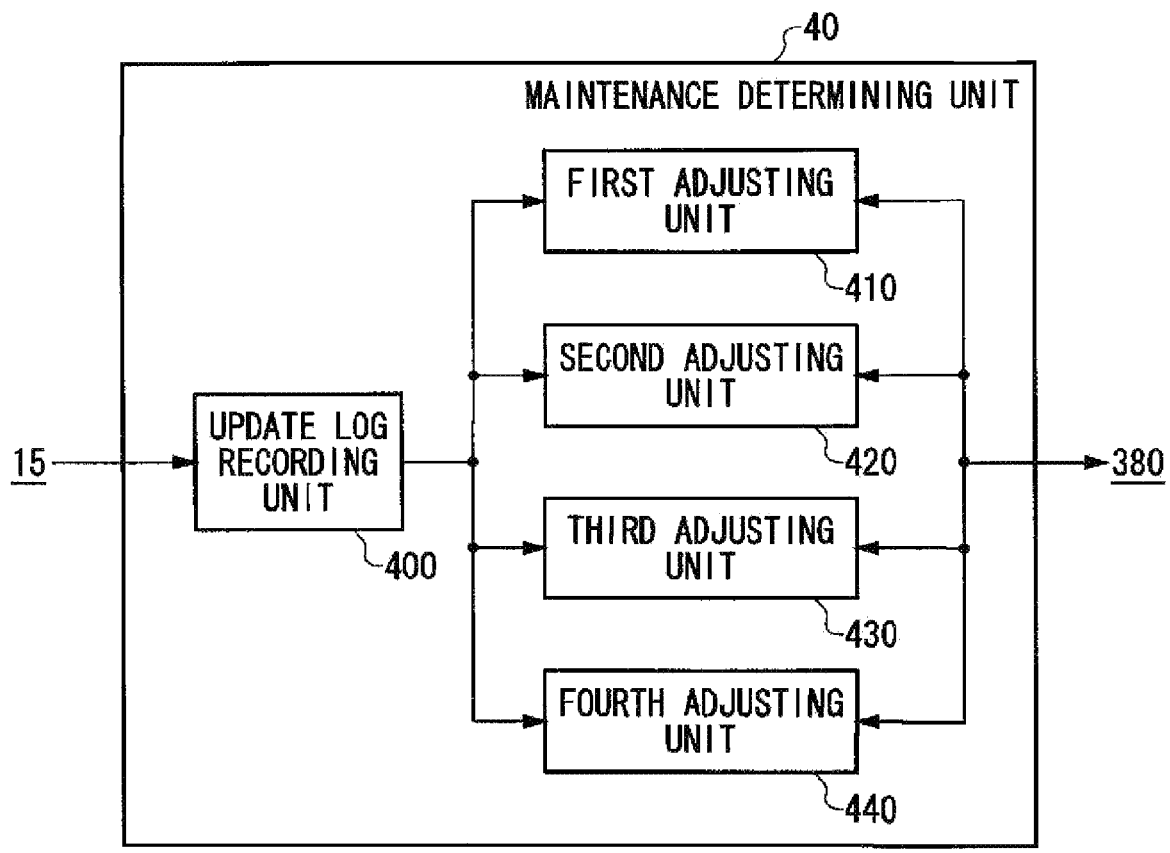
FIG. 4 is a schematic block diagram illustrating one embodiment of a functional configuration of a maintenance determining unit in the database management apparatus of FIG. 1.

FIG. 4 illustrates one embodiment of a functional configuration of the maintenance determining unit 40. The maintenance determining unit 40 may include an update log recording unit 400, a first adjusting unit 410, a second adjusting unit 420, a third adjusting unit 430, and a fourth adjusting unit 440. In response to the database 20 being updated by the access unit 15, the update log recording unit 400 may record an update log. The first adjusting unit 410, in one embodiment, determines whether any of the data elements is deleted from the database 20 and an indirect list element corresponding to that data element is invalidated, in a state where the determining unit 380 has determined that the database 20 is consistent. The first adjusting unit 410 may further determine whether a reference from a data element to another data element has been added, in a state where the determining unit 380 has determined that the database 20 is consistent. These determinations may be performed by referring to the update log recording unit 400.

If any of the data elements has been deleted from the database 20 and an indirect list element corresponding to that data element has been invalidated, the first adjusting unit 410, in one embodiment, changes the first hash value generated by the first generating unit 330. Specifically, the first adjusting unit 410 may subtract identification information of the invalidated indirect list element from the first hash value. It is desirable to weight a value of the identification information to be subtracted with the number of referencing elements corresponding to the identification information. Also, if a reference from a data element to another data element has been added, the first adjusting unit 410 may change the first hash value.

In one embodiment, the second adjusting unit 420 determines whether a reference from a data element to another data element has been changed or added, based on the update log recording unit 400. If a reference from a data element to another data element has been changed or added, the second adjusting unit 420 may change the second hash value generated by the second generating unit 340. For example, the second adjusting unit 420 subtracts identification information recorded in the data element before a change from the second hash value and adds identification information recorded in the data element after a change to the subtracted hash value.

The third adjusting unit 430, in one embodiment, determines whether any of the data elements is deleted from the database 20 and an indirect list element corresponding to that data element is invalidated, in a state where the determining unit 380 has determined that the database is consistent. The third adjusting unit 430 may further determine whether a data element has been added to the database 20. The third adjusting unit 430 may change the third hash value generated by the third generating unit 360 on condition that any of the data elements has been deleted from the database 20 and an indirect list element corresponding to that data element has been invalidated or on condition that a data element has been added. For example, the third adjusting unit 430 subtracts a hash value based on a set of a storage address of the data element recorded in the invalidated indirect list element and identification information of the invalidated indirect list element from the third hash value.

The fourth adjusting unit 440, in one embodiment, changes the fourth hash value generated by the fourth generating unit 370 on condition that any of the data elements has been deleted from the database and an indirect list element corresponding to that data element has been invalidated or on condition that a data element has been added. For example, the fourth adjusting unit 440 subtracts a hash value based on a set of identification information recorded in the deleted data element and a storage address of the data element from the fourth hash value.

In one embodiment, the determining unit 380 receives the changed hash values, and compares the first hash value changed by the first adjusting unit 410 with the second hash value changed by the second adjusting unit 420. The determining unit 380 may further compare the third hash value changed by the third adjusting unit 430 with the fourth hash value changed by the fourth adjusting unit 440. The determining unit 380 may determine that the consistency of the database 20 is maintained on condition that the first hash value is equivalent to the second hash value and the third hash value is equivalent to the fourth hash value.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 5:
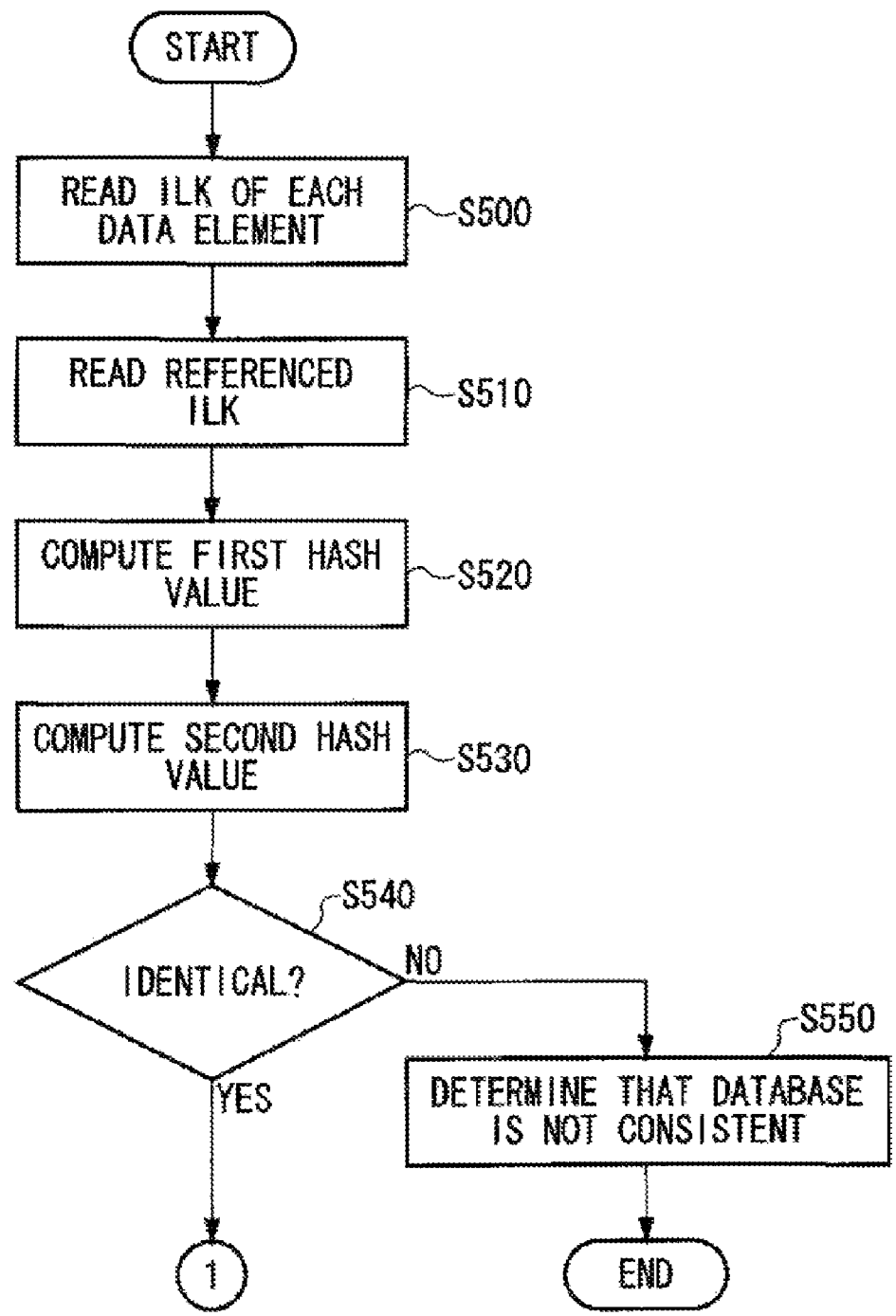
FIG. 5 is a schematic flow chart diagram illustrating one embodiment of a method for a consistency determining unit that determines consistency of a database.
Figure 6:
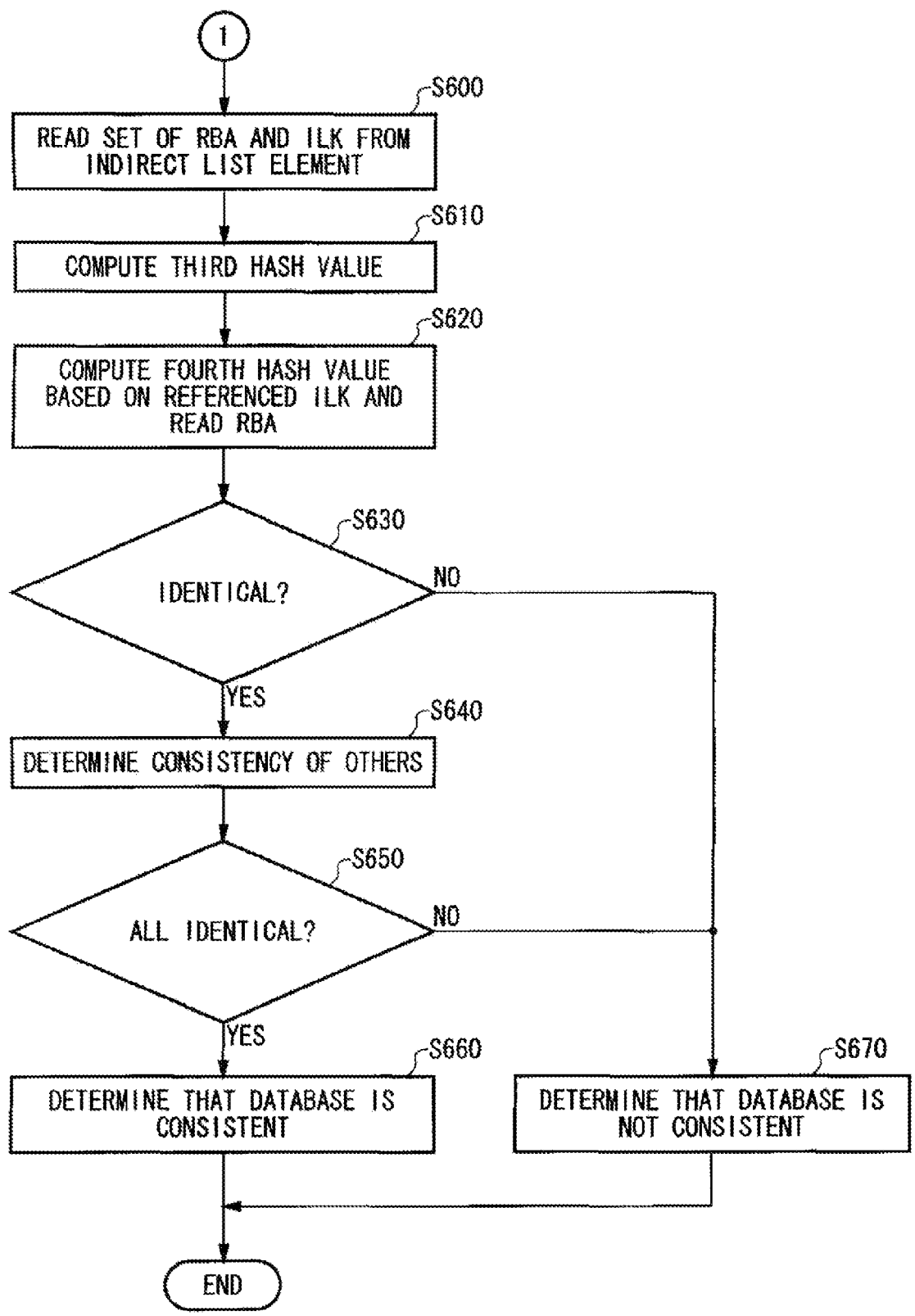
FIG. 6 is a schematic flow chart diagram illustrating one embodiment of a process following the process of FIG. 5.

FIG. 5 illustrates a flowchart of one embodiment of a process by which the consistency determining unit 30 determines consistency of the database 20. FIG. 6 shows a flowchart of one embodiment of a process following the process of FIG. 5. Once the reorganization of the database 20 has been completed, the consistency determining unit 30 may perform the following process. First, the first reading unit 310 reads S500, from each data element, identification information of an indirect list element corresponding to that data element. The first reading unit 310 further reads the number of referencing elements which reference the indirect list element, in association with the identification information. Next, the second reading unit 320 reads S510, from each data element, identification information of an indirect list element corresponding to a data element referenced by that data element.

Then, the first generating unit 330 computes S520 a hash value of the identification information read from each data element by the first reading unit 310. Upon generating this hash value, the first generating unit 330 weights each of the identification information with the corresponding number of referencing elements (for example, it multiplies the identification information by the number of referencing elements.) This hash value is referred to as a first hash value. The second generating unit 340 computes S530 a hash value of the identification information of the indirect list elements read by the second reading unit 320. This hash value is referred to as a second hash value. The determining unit 380 determines S540 whether the first hash value generated by the first generating unit 330 is equivalent to the second hash value generated by the second generating unit 340.

On condition that these hash values are not equivalent to each other (S540: NO), the determining unit 380 determines S550 that the database 20 is not consistent. In this case, the consistency determining unit 30 may perform a full check on the database 20 to detect any inconsistent point. On condition that these hash values are equivalent to each other (S540: YES), the third reading unit 350 reads S600, from each of the indirect list elements, a storage address of a data element corresponding to that indirect list element and identification information (ILK) of that indirect list element.

Then, the third generating unit 360 computes S610 a hash value based on a set of the storage address and identification information (ILK) read from each indirect list element by the third reading unit 350. This hash value is referred to as a third hash value. The fourth generating unit 370 computes S620 a hash value based on a set of the identification information read from each data element by the first reading unit 310 and the storage address of each data element from which the first reading unit 310 reads the identification information. This hash value is referred to as a fourth hash value.

The determining unit 380 determines S630 whether the third hash value generated by the third generating unit 360 is equivalent to the fourth hash value generated by the fourth generating unit 370. On condition that these hash values are not equivalent to each other (S630: NO), the determining unit 380 determines S670 that the database 20 is not consistent. On condition that these hash values are equivalent to each other, the determining unit 380 determines S640 consistency of other portions. For example, the determining unit 380 may perform the following consistency determination.

The determining unit 380 computes, based on the contents of each data element included in the database 20, the sum of the number of data elements referenced by these data elements. The determining unit 380 further computes the sum of the number of valid indirect list elements included in the database 20. On condition that these sums have the equivalent value, the determining unit 380 determines that the database 20 is consistent.

The determining unit 380 further computes the sum of the number of storage addresses of referenced data elements included in each data element in the database 20. The determining unit 380 further computes the sum of the number of referencing elements included in each data element in the database 20. Then, on condition that these sums have the equivalent value, the determining unit 380 determines that the database 20 is consistent.

If the above sums have the equivalent values, respectively, (S650: YES), the determining unit 380 determines S660 that the database 20 is consistent. If any one of them is different (S650: NO), the determining unit 380 determines S670 that the database 20 is not consistent.

Figure 7:
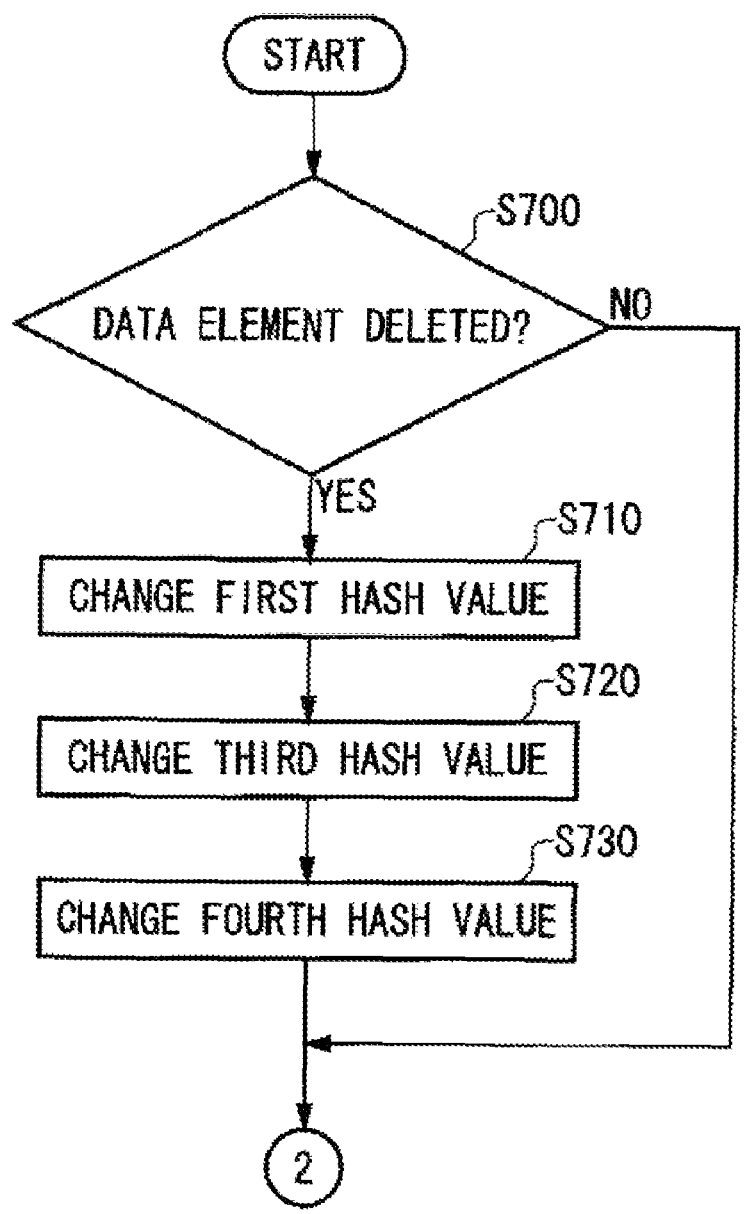
FIG. 7 is a schematic flowchart diagram illustrating one embodiment of a process by which the maintenance determining unit determines whether consistency of a database is maintained.
Figure 8:
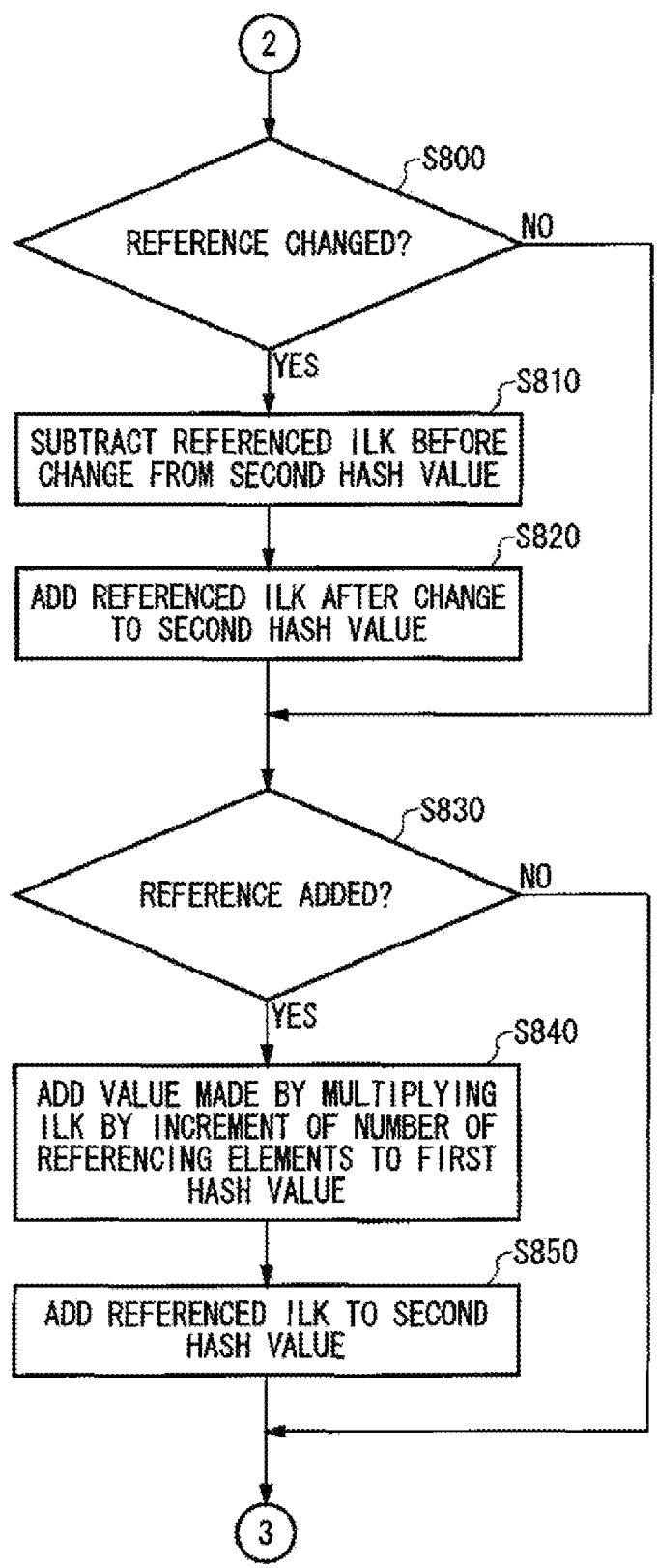
FIG. 8 is a schematic flowchart diagram illustrating one embodiment of a process following the process of FIG. 7.

FIG. 7 shows a flowchart of one embodiment of a process by which the maintenance determining unit 40 determines whether the consistency of the database 20 is maintained. FIG. 8 shows a flowchart of one embodiment of a process following the process of FIG. 7. In a state where the determining unit 380 has determined that the database 20 is consistent, the maintenance determining unit 40 may determine S700 whether any of the data elements is deleted from the database 20 and an indirect list element corresponding to that data element is invalidated. If a data element is deleted, the first adjusting unit 410 changes S710 identification information of the invalidated indirect list element from the hash value generated by the first generating unit 330 by subtracting.

Here, "subtract" means an inverse operation to that for computing a hash value. For example, when the sum of identification information is used as a hash value, the first adjusting unit 410 subtracts identification information of an invalidated indirect list element from the hash value. As another example, when exclusive OR of identification information is used as a hash value, since an inverse operation to an exclusive OR operation is also an exclusive OR operation, the first adjusting unit 410 calculates a changed hash value by performing an exclusive OR operation on a hash value before change and a hash value of the invalidated indirect list element.

The third adjusting unit 430 changes S720 a hash value based on a set of a storage address of a data element included in the invalidated indirect list element and identification information of the invalidated indirect list element from the hash value generated by the third generating unit 360 by subtracting. The fourth adjusting unit 440 changes S730 a hash value based on a set of identification information included in the deleted data element and a storage address of the data element from the hash value generated by the fourth generating unit 370 by subtracting.

Subsequently, the maintenance determining unit 40 determines S800 whether a reference from any of the data elements to another data element has been changed. If the reference has been changed (S800: YES), the second adjusting unit 420 subtracts S810 identification information included in that data element before change from the second hash value generated by the second generating unit 340. Then, the second adjusting unit 420 adds S820 identification information recorded in that data element after change to the second hash value after the subtraction. Here, similarly to "subtract", "add" also means an operation for computing a hash value which is not limited to a simple addition.

Subsequently, the maintenance determining unit 40 determines S830 whether a reference from any of the data elements to another data element has been added. If the reference has been added (S830: YES), the first adjusting unit 410 changes S840 the first hash value. Specifically, the first adjusting unit 410 first obtains an increment from the number of referencing elements included in the referenced data element before addition to the number of referencing elements included in the referenced data element after addition. For example, if only one reference has been added to this data element, this increment is one. Then, the first adjusting unit 410 adds a value made by multiplying identification information of an indirect list element corresponding to the referenced data element by the increment to the first hash value.

Next, the second adjusting unit 420 adds S850 identification information of an indirect list element corresponding to the referenced data element which is added to the referencing data element, to the second hash value. Here, a reference is added not only when an existing data element newly references another existing data element but also when a new data element is added, resulting in addition of a new reference. When a referenced data element is added in concurrence with addition of a reference, the number of referencing elements included in the data element before addition is considered as zero. If a data element is newly added, a process shown in FIG. 9 is subsequently performed.

Figure 9:
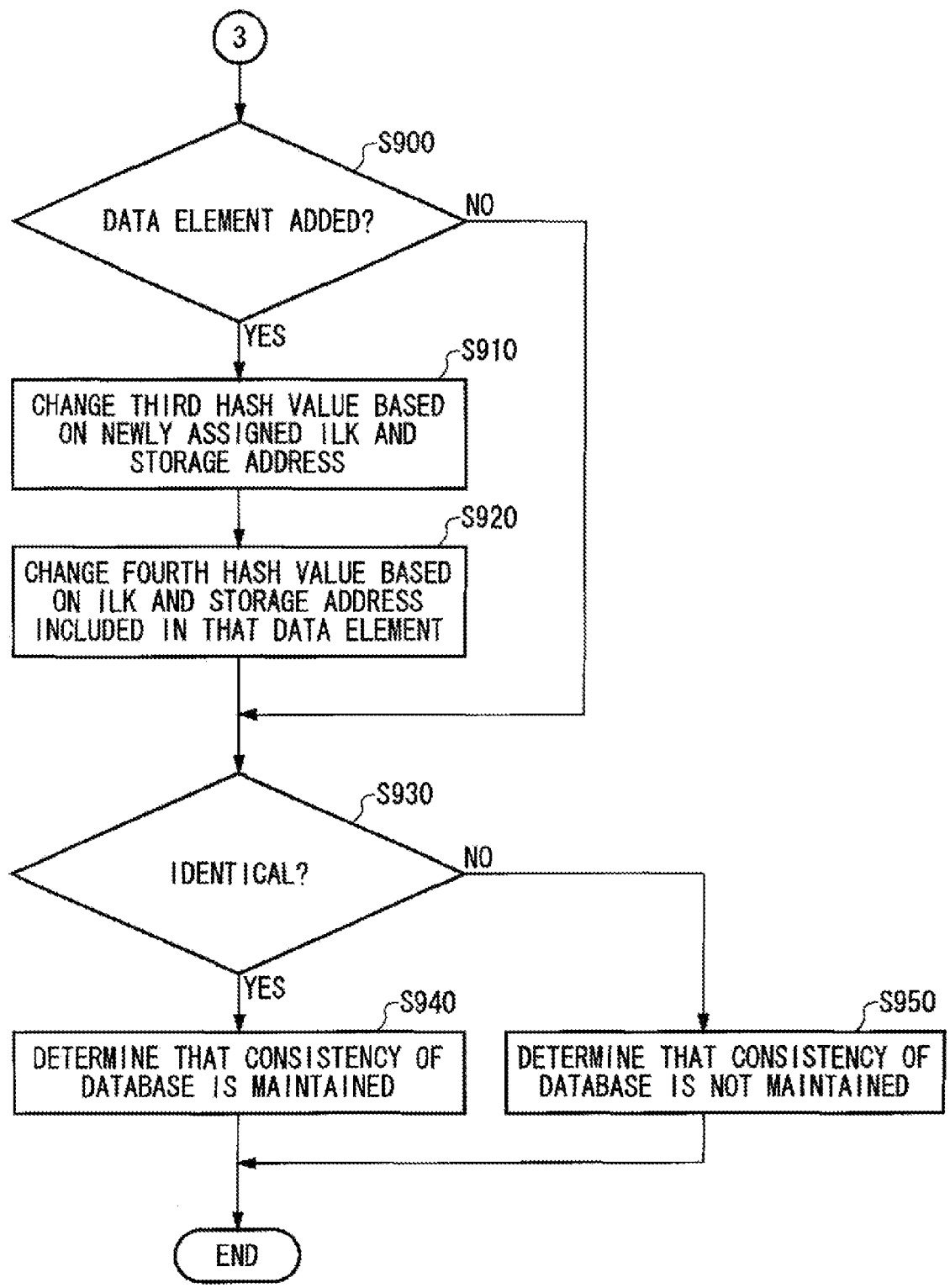
FIG. 9 is a schematic flowchart diagram illustrating one embodiment of a process following the process of FIG. 8.

FIG. 9 illustrates a flowchart of one embodiment of a process following the process of FIG. 8. In a state where the determining unit 380 has determined that the database 20 is consistent, the maintenance determining unit 40 determines S900 whether a data element has been added to the database 20. If a data element has been added to the database 20 (S900: YES), the third adjusting unit 430 changes S910 the third hash value. Specifically, the third adjusting unit 430 obtains a hash value based on a storage address (RBA) of the data element and identification information (ILK) newly assigned to an indirect list element which is added in association with the data element.

The indirect list element corresponding to the added data element may not be generated promptly. Even so, identification information (ILK) to be newly assigned to the indirect list element generated later is determined when the data element is added, and is recorded in the data element. The third adjusting unit 430 changes S910 the third hash value by using this identification information.

Next, the fourth adjusting unit 440 adds S920 a hash value based on the identification information (ILK) of the indirect list element corresponding to the added data element, which is included in that data element, and a storage address of the added data element to the fourth hash value. The determining unit 380 determines S930 whether the first hash value changed by the first adjusting unit 410 is equivalent to the second hash value changed by the second adjusting unit 420. The determining unit 380 further determines S930 whether the third hash value changed by the third adjusting unit 430 is equivalent to the fourth hash value changed by the fourth adjusting unit 440. On condition that both determinations are affirmative (S930: YES), the determining unit 380 determines S940 that the consistency of the database 20 is maintained.

On the other hand, if either of the determinations is negative (S930: NO), the determining unit 380 determines S950 that the consistency of the database 20 is not maintained.

Figure 10:
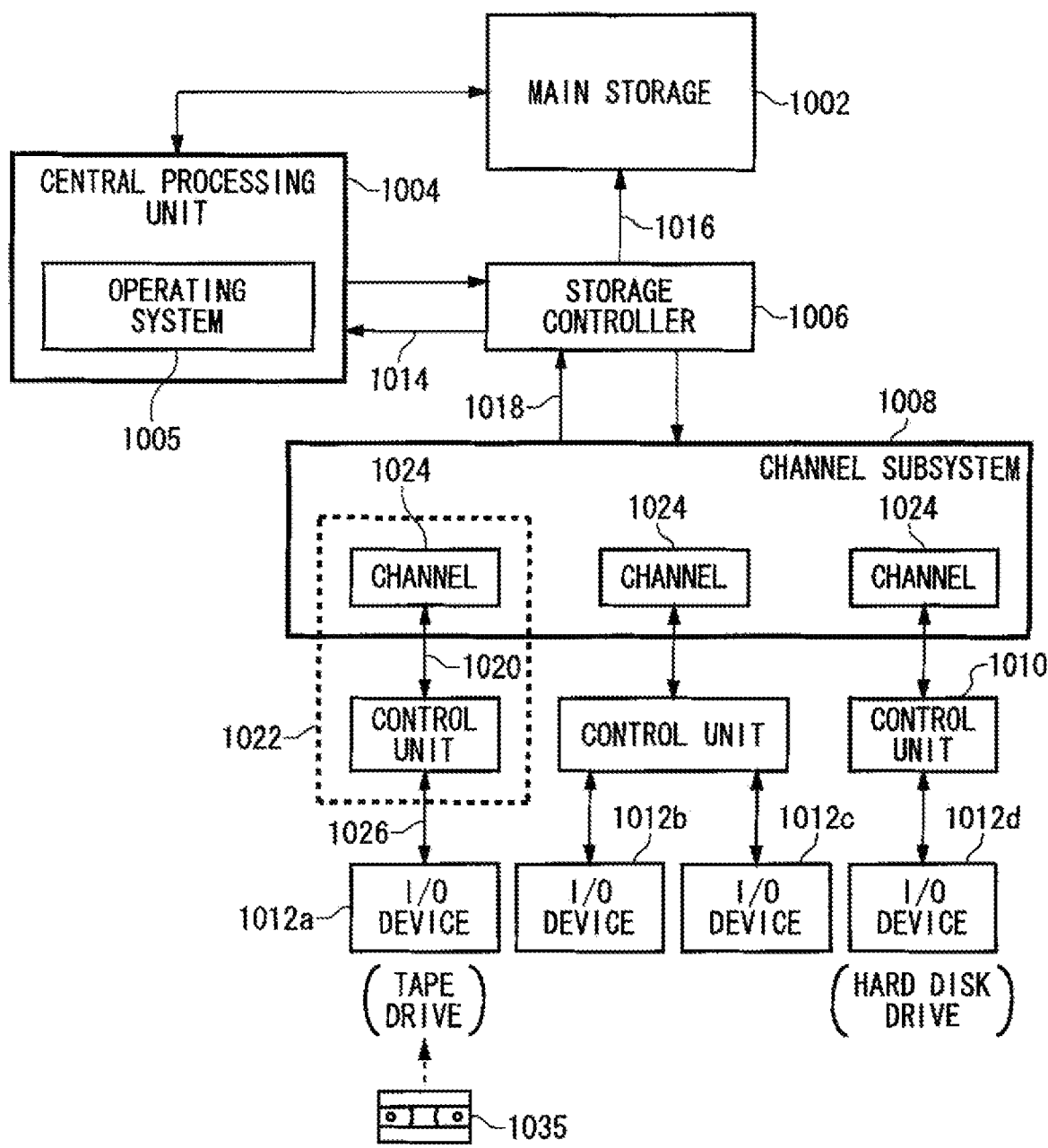
FIG. 10 is a schematic block diagram illustrating one embodiment of a hardware configuration of an information processing apparatus functioning as the database management apparatus of FIG. 1.

FIG. 10 illustrates one embodiment of a hardware configuration of an information processing apparatus 1000 functioning as the database management system 10. The information processing apparatus 1000 may be a mainframe computer, which may include a main storage 1002, at least one central processing unit 1004, a storage controller 1006, a channel subsystem 1008, at least one control unit 1010, and at least one I/O device 1012a to 1012d.

The main storage 1002, in one embodiment, stores data and programs input from the I/O devices 1012a to 1012d. When addressed by the central processing unit 1004 or the channel subsystem 1008, the main storage 1002 may send data stored at the specified address to the central processing unit 1004 or the channel subsystem 1008.

In one embodiment, the central processing unit 1004 controls the whole of the information processing apparatus 1000, and runs at least one operating system 1005. The operating system 1005 may control program execution and input/output processing in the information processing apparatus 1000. For example, the operating system 1005 may control the execution of other programs operating on the central processing unit 1004, or may control data transfer to or from the I/O devices 1012a to 1012d.

The storage controller 1006, in one embodiment, is connected to the central processing unit 1004 via a bus 1014 which may be either bidirectional or unidirectional. The storage controller 1006 is also connected to the main storage 1002 via a bus 1016, and to the channel subsystem 1008 via a bus 1018. The storage controller 1006 may temporarily store (or queue) an access request received from the central processing unit 1004 or the channel subsystem 1008, and send the access request to the main storage 1002 at an appropriate time.

In one embodiment, the channel subsystem 1008 is connected to each of the control units 1010 via a data transfer path 1020. The channel subsystem 1008 may control data transfer between the I/O devices 1012a to 1012d and the main storage 1002. The channel subsystem 1008 may transfer data to the I/O devices 1012a to 1012d via at least one channel pass 1022. Each channel pass 1022 may have a channel 1024 provided in the channel subsystem 1008, at least one control unit 1010 and the data transfer path 1020. Here, the data transfer path 1020 may be a serial link based on, e.g., ESCON (Enterprise Systems Connection Architecture). Alternatively, the data transfer path 1020 may be a parallel OEMI, or may be a fiber channel.

The control unit 1010, in one embodiment, controls at least one of the I/O devices 1012a to 1012d. For example, the control unit 1010 may control data transfer timing in each of the I/O devices 1012a to 1012d. The control unit 1010 may be connected to at least one of the I/O devices 1012a to 1012d via a bus 1026. As an example, the control unit 1010 can access up to 256 I/O devices.

In one embodiment, the I/O devices 1012a to 1012d may transfer data to or receive data from the main storage 1002 via the control unit 1010, the channel subsystem 1008, and the storage controller 1006. Here, the I/O device 1012a is specifically a magnetic tape drive, and the I/O device 1012d is a hard disk drive. Alternatively or additionally, the I/O devices 1012a to 1012d may be a display, a keyboard, a printer, a communication device, various sensors, and/or other storage devices. As an example, at least one of the I/O devices 1012a to 1012d may be connected to the database 20 to access the database 20.

In one embodiment, a program according to the present invention may be stored in the main storage 1002 from the I/O device 1012*a* (tape drive) via the channel subsystem 1008. Operations performed by the information processing apparatus 1000 according to the stored program are described above for the database management system 10 with reference to FIGS. 1 to 9.

The program described above may be stored on an external storage medium other than the tape drive in one embodiment. A storage medium may be an optical recording medium such as a DVD or a PD, a magneto-optical recording medium such as an MD, a at semiconductor memory such as an IC card, or any other suitable medium in addition to a flexible disk or a CD-ROM. Alternatively, a storage device such as a hard disk or a RAM provided in a server system connected to a private communication network or the Internet may be used as the recording medium to provide a program to the information processing apparatus 1000 via the network.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising a logic unit stored on a computer readable medium for determining consistency of a database, the apparatus comprising:
a microprocessor;
a memory in communication with the microprocessor, the memory comprising a logic unit, the logic unit comprising
a plurality of data elements recorded in a data recording section, each data element identified by a unique indirect list key, each data element comprising a data portion and a prefix, the prefix comprising a first indirect list key identifying that data element, information identifying the number of data elements referencing that data element, an second indirect list key identifying a data element referenced by that data element and the relative byte address of the data element identified by the second indirect list key;
an indirect list element recorded for each data element in a reference recording section, each indirect list element identifying the first indirect list key, a relative byte address of the data element identified by the first indirect list key and information identifying the number of times the data element identified by the first indirect list key has been reorganized;
a first generating unit configured to generate a first hash value for a first data element, the first hash value generated by weighting the first independent list key with the number of data elements referencing that first data element;
a second generating unit configured to generate a second hash value for the first data element, the second hash value generated by summing the independent list key values of each data element that references the first data element;
a third generating unit configured to generate a third hash value based on the relative byte address and indirect list key for each indirect list element recorded in the reference recording section;
a fourth generating unit configured to generate a fourth hash value based on a indirect list key and relative byte address for each referencing data element recorded in the data recording section; and
a determining unit configured to:
determine that the database is consistent in response to the first hash value being equivalent to the second hash value and the third hash value being equivalent to the fourth hash value; and
report whether the database is consistent in response to determining that the database is consistent.

2. The apparatus of claim 1, further comprising:
a first adjusting unit responsive to an addition of a reference from a data element to another data element, the first adjusting unit configured to add to the information identifying the number of data elements referencing that data element contained within the referenced data elements prefix, a value corresponding to an increment from the number of referencing elements included in the referenced data element before addition of the reference to the number of referencing elements included in the referenced data element after addition of the reference; and
a second adjusting unit configured to add to the hash value generated by the second generating unit an independent list key value of the additional referencing data element.

3. The apparatus of claim 1, further comprising:
a third adjusting unit configured to add to the hash value generated by the third generating unit a hash value based on an indirect list key newly assigned to an indirect list element added in association with the data element and a relative byte address of the data element; and
a fourth adjusting unit configured to add a hash value to the hash value generated by the fourth generating unit based on an indirect list key of an indirect list element corresponding to the added data element, which is included in the added data element, and a relative byte address of the added data element.

4. The apparatus of claim 1, further comprising:
control information recorded in the database in association with each indirect list element, the control information indicating whether that indirect list element is invalid; and
wherein the third generating unit calculates the third hash value by excluding each invalid indirect list element.

5. The apparatus of claim 4, further comprising:
a reorganization unit configured to reorganize the database by changing a relative byte address of a data element; and
a reorganization controlling unit configured to record the number of reorganization operations performed on the reorganized database and record the number of the reorganization operations performed on data elements corresponding to indirect list elements as the control information in with the associated indirect list element,
wherein the third generating unit determines that an indirect list element is invalid in response to determining the number of reorganization operations recorded in association with the indirect list element is smaller than the number of reorganization operations associated with the database.

6. The apparatus of claim 2, further comprising:
control information recorded in the database in association with each indirect list element, the control information indicating whether that indirect list element is invalid;
a third adjusting unit configured to respond to a deletion of a data element from the database and an invalidation of an indirect list element corresponding to the deleted data element and the determination that the database is consistent by subtracting from the hash value generated by the third generating unit a hash value based on a relative byte address of the data element included in the invalidated indirect list element and the independent list key information of the invalidated indirect list element; and a fourth adjusting unit configured to subtract from the hash value generated by the fourth generating unit a hash value based on the independent list key information included in the deleted data element and the relative byte address of the data element, the determining unit determining that the consistency is maintained on condition that the hash value changed by the third adjusting unit is equivalent to the hash value changed by the fourth adjusting unit.

7. The apparatus of claim 1, further comprising:

control information recorded in the database in association with each indirect list element, the control information indicating whether that indirect list element is invalid;

a first adjusting unit configured to respond to a deletion of a data element from the database and an invalidation of an indirect list element corresponding to the deleted data element and the determination that the database is consistent by subtracting from the hash value generated by the first generating unit the independent list key information of the invalidated indirect list element; and a second adjusting unit configured to respond to a change of a reference from a data element to another data element by subtracting from the hash value generated by the second generating unit the independent list key information included in the data element before change and add to the subtracted hash value the independent list key information recorded in the data element after change, the determining unit determining that the consistency is maintained on condition that the hash value changed by the first adjusting unit is equivalent to the hash value changed by the second adjusting unit.

8. A computer program product stored on a computer readable medium and comprising code that, when executed, cause a computer to implement operations for determining, by an information processing apparatus, consistency of a database, the operations of the computer program product comprising:

generating a first hash value for a first data element recorded in a data recording section, the first hash value generated by weighting a first independent list key with the number of data elements referencing that first data element;

generating a second hash value for the first data element, the second hash value generated by summing independent list key values of each data element that references the first data element;

generating a third hash value based on a relative byte and a indirect list key for each of a plurality of indirect list elements recorded for each data element in a reference recording section;

generating a fourth hash value based on a indirect list key and a relative byte address for each referencing data element recorded in the data recording section;

determining that the database is consistent in response to the first hash value being equivalent to the second hash value and the third hash value being equivalent to the fourth hash value; and reporting whether the database is consistent in response to determining that the database is consistent.

9. A computer program product stored on a computer readable medium having computer usable program code programmed for determining consistency of a database in which an indirect list element is recorded for each data element identified by a unique independent list key, the indirect list element including a relative byte address of that data element in order to permit another data element to reference that data element, the operations of the computer program product comprising:

generating in a first generating unit a hash value for a first data element recorded in a data recording section, the first hash value generated by weighting a first independent list key with the number of data elements referencing that first data element;

generating in a second generating unit a hash value for the first data element, the second has value generated by summing independent list key values of each data element that references the first data element;

generating in a third generating unit a hash value based on a relative byte and a indirect list key for each of a plurality of indirect list elements recorded for each data element in a reference recording section;

generating in a fourth generating unit a hash value based on a indirect list key and a relative byte address for each referencing data element recorded in the data recording section; and determining in a determining unit that the database is consistent in response to the hash value generated by the first generating unit being equivalent to the hash value generated by the second generating unit and the has value generated by the third generating unit being equivalent to the hash value generated by the fourth generating unit and reporting a determination arrived at by the determining unit.

* * * * *